(12) United States Patent
Ishi et al.

(10) Patent No.: US 11,491,562 B2
(45) Date of Patent: Nov. 8, 2022

(54) CUTTING TOOL AND METHOD FOR MANUFACTURING MACHINED PRODUCT

(71) Applicant: KYOCERA Corporation, Kyoto (JP)

(72) Inventors: Hirohisa Ishi, Moriyama (JP); Kento Iwasaki, Yasu (JP)

(73) Assignee: KYOCERA CORPORATION, Kyoto (JP)

(*) Notice: Subject to any disclaimer, the term of this patent is extended or adjusted under 35 U.S.C. 154(b) by 191 days.

(21) Appl. No.: 16/757,795

(22) PCT Filed: Oct. 2, 2018

(86) PCT No.: PCT/JP2018/036934
§ 371 (c)(1),
(2) Date: Apr. 21, 2020

(87) PCT Pub. No.: WO2019/087656
PCT Pub. Date: May 9, 2019

(65) Prior Publication Data
US 2021/0370417 A1    Dec. 2, 2021

(30) Foreign Application Priority Data
Oct. 30, 2017 (JP) .............................. JP2017-209077

(51) Int. Cl.
*B23B 51/06* (2006.01)
*B23C 5/28* (2006.01)
*B23B 51/04* (2006.01)

(52) U.S. Cl.
CPC ............ *B23C 5/28* (2013.01); *B23B 51/0493* (2013.01); *B23B 51/06* (2013.01); *B23B 2251/406* (2013.01)

(58) Field of Classification Search
CPC .......... B23B 51/0439; B23B 2251/406; B23B 51/06; B23B 2270/30; B23B 51/0486;
(Continued)

(56) References Cited

U.S. PATENT DOCUMENTS 3,816,018 A * 6/1974 Hlocky ................... B23B 51/06
                                                           408/59
4,966,503 A * 10/1990 Davidson ................ B23B 51/06
                                                           408/229
(Continued)

FOREIGN PATENT DOCUMENTS

CN        101663120 A     3/2010
DE    102014013210 A1     3/2016
(Continued)

*Primary Examiner* — Eric A. Gates
*Assistant Examiner* — Paul M Janeski
(74) *Attorney, Agent, or Firm* — Volpe Koenig

(57) ABSTRACT

A cutting tool may include a main body extended from a first end to a second end. The main body may be rotatable around a rotation axis. The main body may include a first cutting edge, a second cutting edge, a first flute and a second flute. The first flute may be extended from the first cutting edge toward the second end. The second flute may be extended from the second cutting edge toward the second end. The first flute may include a first hole located in the main body. The second flute may include a second hole located in the main body. The first hole may have a circular shape and the second hole may have a long narrow shape in a circumferential direction of the rotation axis in a cross section orthogonal to the rotation axis.

13 Claims, 15 Drawing Sheets

(58) Field of Classification Search
CPC .......... B23B 51/04; B23B 51/00; B23C 5/28;
B23C 2210/40; B23C 2230/04; B23D
2277/30; B23D 2277/44; B23D 77/006
See application file for complete search history.

(56) References Cited

U.S. PATENT DOCUMENTS

| | | | | |
|---|---|---|---|---|
| 5,964,553 A | * | 10/1999 | Blomberg | B23B 51/0493 408/223 |
| 5,993,119 A | * | 11/1999 | Moller | B23B 51/0493 408/229 |
| 6,019,553 A | * | 2/2000 | Yakamavich, Jr. | B23B 51/0486 403/199 |
| 7,572,088 B2 | * | 8/2009 | Biscay | B23B 51/0493 408/59 |
| 2006/0045640 A1 | * | 3/2006 | Hessman | B23B 51/0493 408/81 |
| 2009/0297285 A1 | * | 12/2009 | Nomura | B23B 51/0486 408/59 |
| 2010/0040425 A1 | * | 2/2010 | Nomura | B23B 51/0493 408/83 |
| 2010/0135739 A1 | | 6/2010 | Nomura et al. | |

FOREIGN PATENT DOCUMENTS

| | | | | |
|---|---|---|---|---|
| DE | 102016120595 A1 | * | 5/2018 | ......... B23B 51/0486 |
| JP | 57-089511 A | | 6/1982 | |
| JP | 10-244411 A | | 9/1998 | |
| WO | WO-2013038565 A1 | * | 3/2013 | ........... B23B 51/048 |
| WO | WO-2017073663 A1 | * | 5/2017 | ........... B23B 51/048 |

* cited by examiner

CUTTING TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/036934, filed on Oct. 2, 2018, which claims priority to Japanese Application No. 2017-209077, filed on Oct. 30, 2017, which is entirely incorporated herein by reference.

TECHNICAL FIELD

The present disclosure generally relates to cutting tools for use in a cutting process of a workpiece and, more specifically, to cutting tools for use in a milling process.

BACKGROUND

Cutting tools respectively discussed in Japanese Unexamined Patent Publication No. 57-089511 (Patent Document 1) and Japanese Unexamined Patent Publication No. 10-244411 (Patent Document 2) have been known as a cutting tool for use in a cutting process of a workpiece, such as metal. The cutting tool discussed in Patent Document 1 may include a cutting edge disposed on a front end part of a drill main body, and a chip discharge hole disposed along an axis in the drill main body. The cutting tool discussed in Patent Document 2 may include a tool main body and peripheral cutting edges. The peripheral cutting edges may include an inner peripheral cutting edge and an outer peripheral cutting edge which are attached to the tool main body.

SUMMARY

A cutting tool in one of a non-limiting embodiment may include a main body having a bar shape extended from a first end to a second end. The main body may be rotatable around a rotation axis. The main body may include a first cutting edge, a second cutting edge, a first flute and a second flute. The first cutting edge may be located on a side of a first end. The second cutting edge may be located on a side of the first end and located closer to a side of an outer periphery of the main body than the first cutting edge. The first flute may be extended from the first cutting edge toward the second end. The second flute may be extended from the second cutting edge toward the second end. The first flute may include a first hole located in the main body. The second flute may include a second hole located in the main body. The first hole may have a circular shape and the second hole may have a long narrow shape in a circumferential direction of the rotation axis in a cross section orthogonal to the rotation axis.

EMBODIMENTS

Figure 1:
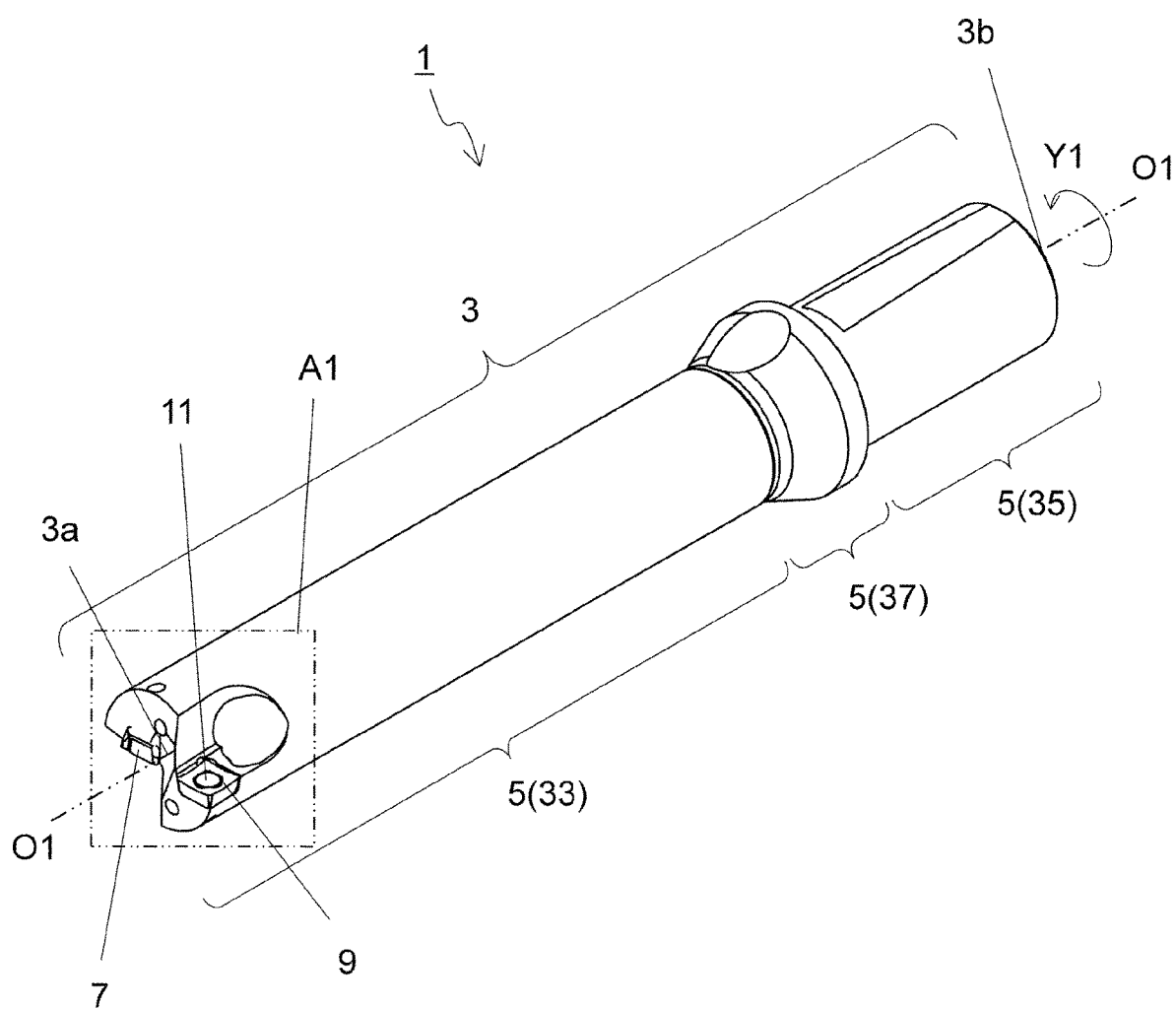
FIG. 1 is a perspective view illustrating a cutting tool in a non-limiting embodiment.

Cutting tools 1 in non-limiting embodiments may be individually described in detail below with reference to the drawings. For the sake of description, each of the drawings referred to in the following illustrates, in a simplified form, only main members necessary for describing a non-limiting embodiment. The cutting tools 1 disclosed below may therefore be capable of including any arbitrary structural member not illustrated in the drawings referred to. Dimensions of the members in each of the drawings may be ones which faithfully represent neither dimensions of actual structural members nor dimension ratios of these members.

The cutting tool 1 in a non-limiting embodiment illustrated in FIG. 1 may be a drill that is one kind of rotary tools. Examples of the rotary tools may include end mills and reamers besides the drills. No problem may occur even if the cutting tool 1 is an end mill or reamer.

The cutting tool 1 may include a main body 3 having a bar shape extended from a first end 3a to a second end 3b along a rotation axis O1 in a non-limiting embodiment illustrated in FIG. 1. In general, the first end 3a may be called "a front end" and the second end 3b may be called "a rear end." The main body 3 may be configured to extend from the first end 3a to the second end 3b, and may have, for example, a columnar shape or polygonal column shape. The main body 3 may be rotatable around the rotation axis O1. An arrow Y1 in FIG. 1 or the like may indicate a rotation direction of the cutting tool 1.

The main body 3 may be constituted by one or a plurality of members. The cutting tool 1 including the main body 3 constituted by the single member may be generally called "solid type." The main body 3 may be constituted by the plurality of members in a non-limiting embodiment illustrated in FIG. 1. Specifically, the main body 3 may include a holder 5, a first insert 7, a second insert 9 and two fixing members 11 in a non-limiting embodiment illustrated in FIG. 2.

The holder 5 may have a bar shape extended along the rotation axis O1 from the first end 3a to the second end 3b as in a non-limiting embodiment illustrated in FIG. 1. The holder 5 may include a first pocket 13 and a second pocket 15 individually located on a side of the first end 3a. The first pocket 13 and the second pocket 15 may respectively open into a side of the first end 3a and a side of an outer peripheral surface in a non-limiting embodiment illustrated in FIG. 2.

The first insert 7 may be located in the first pocket 13. The second insert 9 may be located in the second pocket 15. The first insert 7 may be fixed to the first pocket 13 by one of the fixing members 11. The second insert 9 may be fixed to the second pocket 15 by the other of the fixing members 11.

Figure 2:
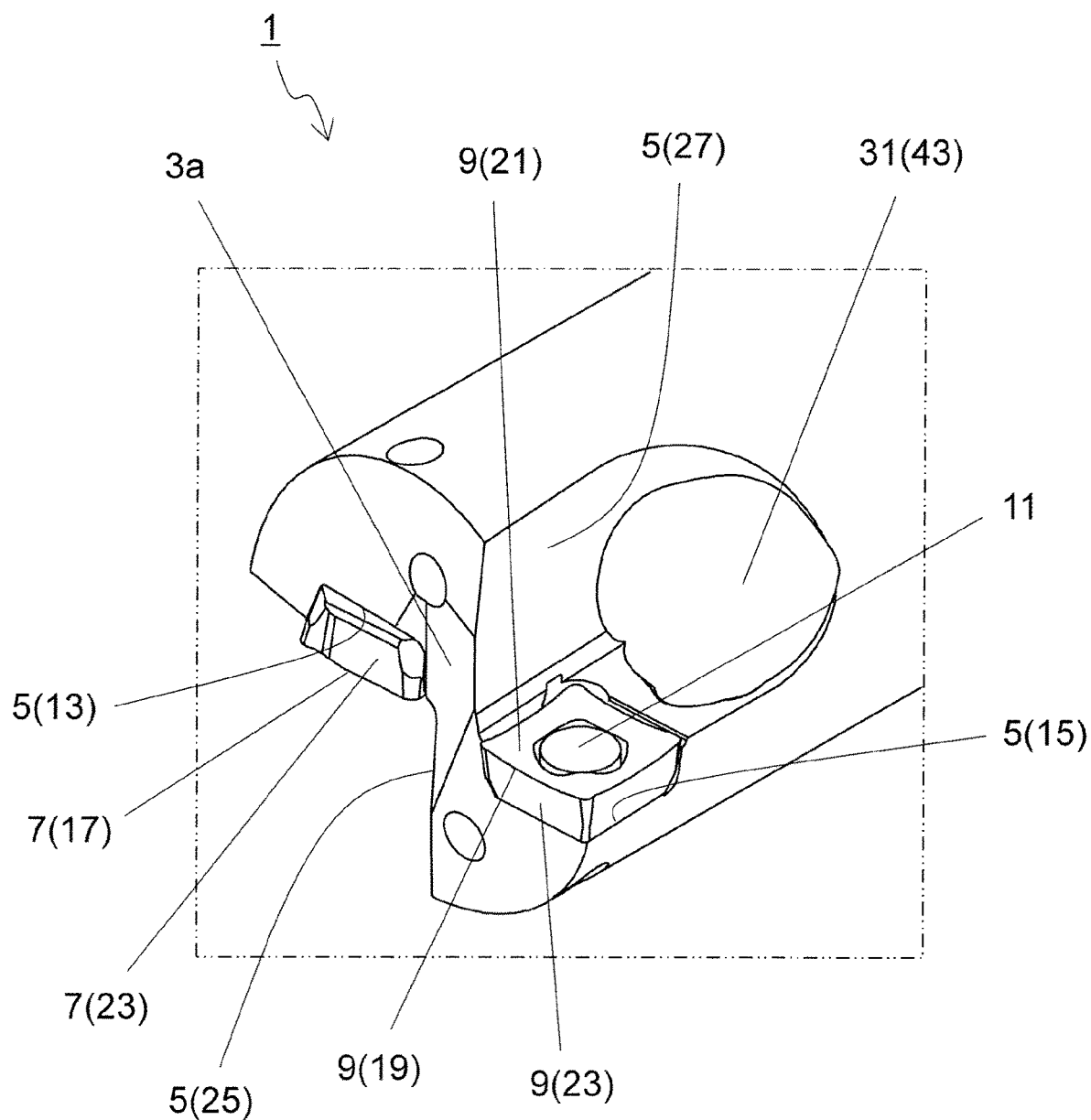
FIG. 2 is an enlarged view of a region A1 illustrated in FIG. 1.

The first insert 7 may include a first cutting edge 17 in a non-limiting embodiment illustrated in FIG. 2. The second insert 9 may include a second cutting edge 19 in a non-limiting embodiment illustrated in FIG. 2. The first cutting edge 17 in the first insert 7 and the second cutting edge 19 in the second insert 9 may be individually located on a side of the first end 3a in the main body 3. In the other words, the main body 3 may include the first cutting edge 17 and the second cutting edge 19 on the side of the first end 3a in a non-limiting embodiment illustrated in FIG. 1.

Figure 3:
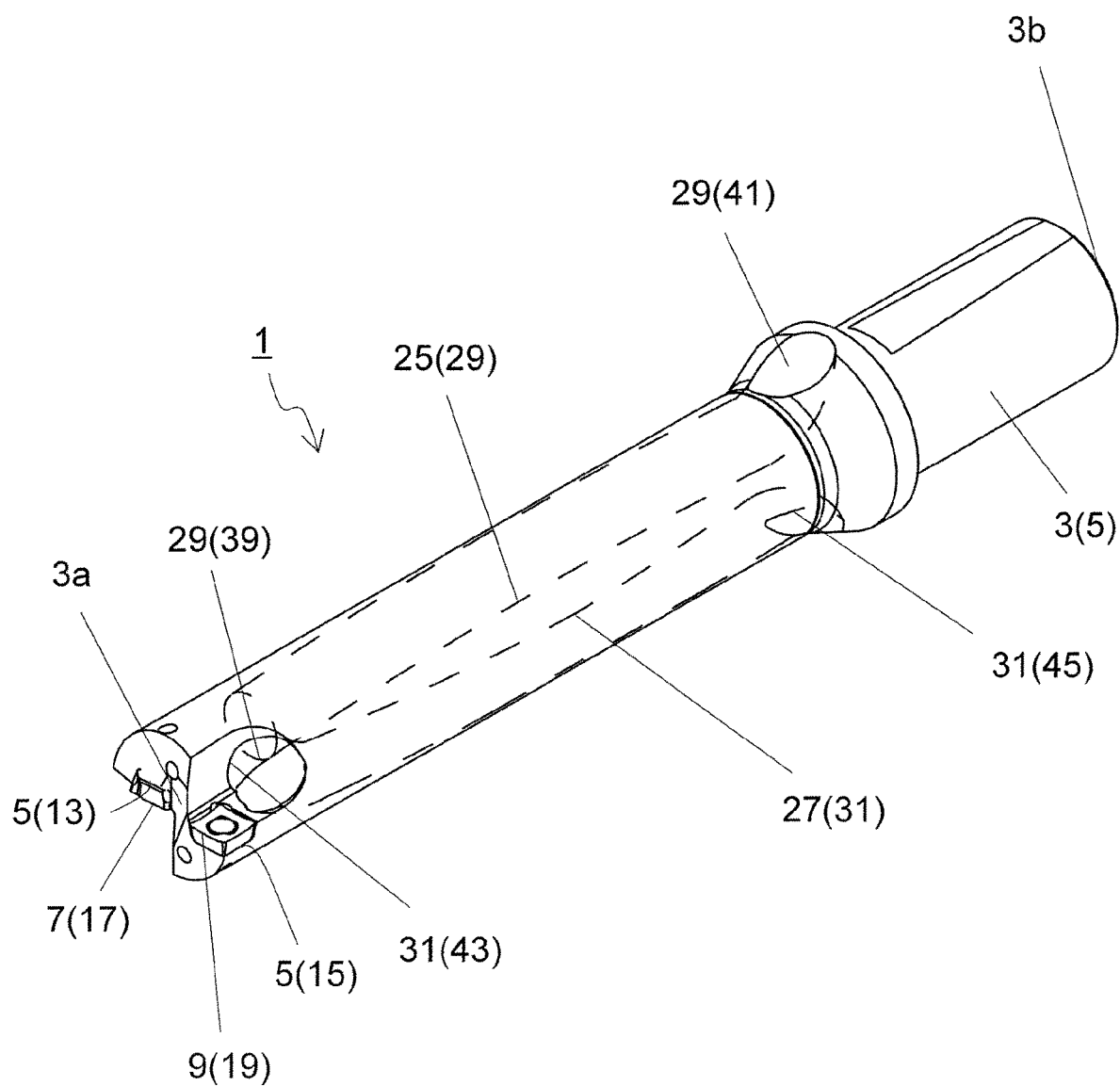
FIG. 3 is a perspective view of a first flute and a second flute in the cutting tool illustrated in FIG. 1.

The second cutting edge 19 may be located closer to an outer periphery of the main body 3 than the first cutting edge 17 in one embodiment illustrated in FIG. 3. Specifically, the first cutting edge 17 may be capable of serving as a so-called inner peripheral cutting edge, and the second cutting edge 19 may be capable of serving as a so-called outer peripheral cutting edge in a non-limiting embodiment illustrated in FIG. 3.

The phrase that "the second cutting edge 19 is located closer to the outer periphery of the main body 3 than the first cutting edge 17" is not limited to such a configuration that the entirety of the second cutting edge 19 is located closer to the outer periphery of the main body 3 than the first cutting edge 17. At least a center of the second cutting edge 19 may be located closer to the outer periphery of the main body 3 than a center of the first cutting edge 17.

The first insert 7 and the second insert 9 may have a rectangular plate shape in a non-limiting embodiment illustrated in FIG. 2. The shapes of the first insert 7 and the second insert 9 are not limited to a specific shape. There is no problem even if the first insert 7 and the second insert 9 have a triangular plate shape.

The first insert 7 and the second insert 9 in a non-limiting embodiment illustrated in FIG. 2 may individually include an upper surface 21 and a lower surface each having a rectangular shape, a side surface 23 located between the upper surface 21 and the lower surface, and a cutting edge located on at least a part of a ridge line where the upper surface 21 intersects with the side surface 23. The cutting edge in the first insert 7 may correspond to the first cutting edge 17. The cutting edge in the second insert 9 may correspond to the second cutting edge 19.

The first insert 7 may be attached to the first pocket 13 so that the upper surface 21 is directed forward in the rotation direction Y1 in a non-limiting embodiment illustrated in FIG. 2. Similarly, the second insert 9 may be attached to the second pocket 15 so that the upper surface 21 is directed forward in the rotation direction Y1 in a non-limiting embodiment illustrated in FIG. 2.

Attachment of the first insert 7 to the first pocket 13 and attachment of the second insert 9 to the second pocket 15 are not limited to the above configuration. For example, the first insert 7 may be attached to the first pocket 13 so that the upper surface 21 is directed to the outer peripheral surface of the holder 5.

The first insert 7 and the second insert 9 may individually include through holes that open into the upper surface 21 and the lower surface in a non-limiting embodiment illustrated in FIG. 2. The through holes need not open into the upper surface and the lower surface. For example, the through holes may open into the side surface 23.

The fixing members 11 may be members for fixing the first insert 7 and the second insert 9 to the holder 5. The fixing members 11 may be screws in a non-limiting embodiment illustrated in FIG. 2. The fixing members 11 may be, for example, clamping members instead of the screws.

In a non-limiting embodiment illustrated in FIG. 2, the first insert 7 and the second insert 9 may individually include the through holes as described above, and the holder 5 may include screw holes at positions corresponding to the through holes. These inserts can be fixed to the holder 5 by inserting the screws into the through holes of the inserts, and by fixing the screws to the screw holes of the holder 5.

The holder 5 may include a first flute 25 extended from the first pocket 13 toward the second end 3b in one embodiment illustrated in FIG. 3. The first insert 7 including the first cutting edge 17 may be located in the first pocket 13. In other words, the main body 3 may include the first flute 25 extended from the first cutting edge 17 toward the second end 3b in a non-limiting embodiment illustrated in FIG. 1.

The first flute 25 may be a region through which chips generated by the first cutting edge 17 flow during a cutting process of a workpiece. The cutting process may correspond to a drilling process because the cutting tool 1 is the drill in a non-limiting embodiment illustrated in FIG. 1.

The holder 5 may include a second flute 27 extended from the second pocket 15 toward the second end 3b in one embodiment illustrated in FIG. 3. The second insert 9 including the second cutting edge 19 may be located in the second pocket 15. In other words, the main body 3 may include the second flute 27 extended from the second cutting edge 19 toward a side of the second end 3b in a non-limiting embodiment illustrated in FIG. 1. The second flute 27 may be a region through which chips generated by the second cutting edge 19 flow during the cutting process of the workpiece.

The first flute 25 may include a first hole 29 located in the holder 5 in one embodiment illustrated in FIGS. 3 to 7. Because the first flute 25 includes the first hole 29, an inner wall of a machined hole of the workpiece may be less prone to damage due to the chips flowing through the first flute 25. The second flute 27 may include a second hole 31 located in the holder 5 in a non-limiting embodiment illustrated in FIGS. 3 to 7. Because the second flute 27 includes the second hole 31, the inner wall of the machined hole of the workpiece may be less prone to damage due to the chips flowing through the second flute 27.

The first hole 29 and the second hole 31 may be extended straight along the rotation axis O1 or alternatively be extended spirally around the rotation axis O1. If the first hole 29 and the second hole 31 are extended spirally as illustrated in a non-limiting embodiment illustrated in FIG. 3, chips may have higher durability.

Figure 9:
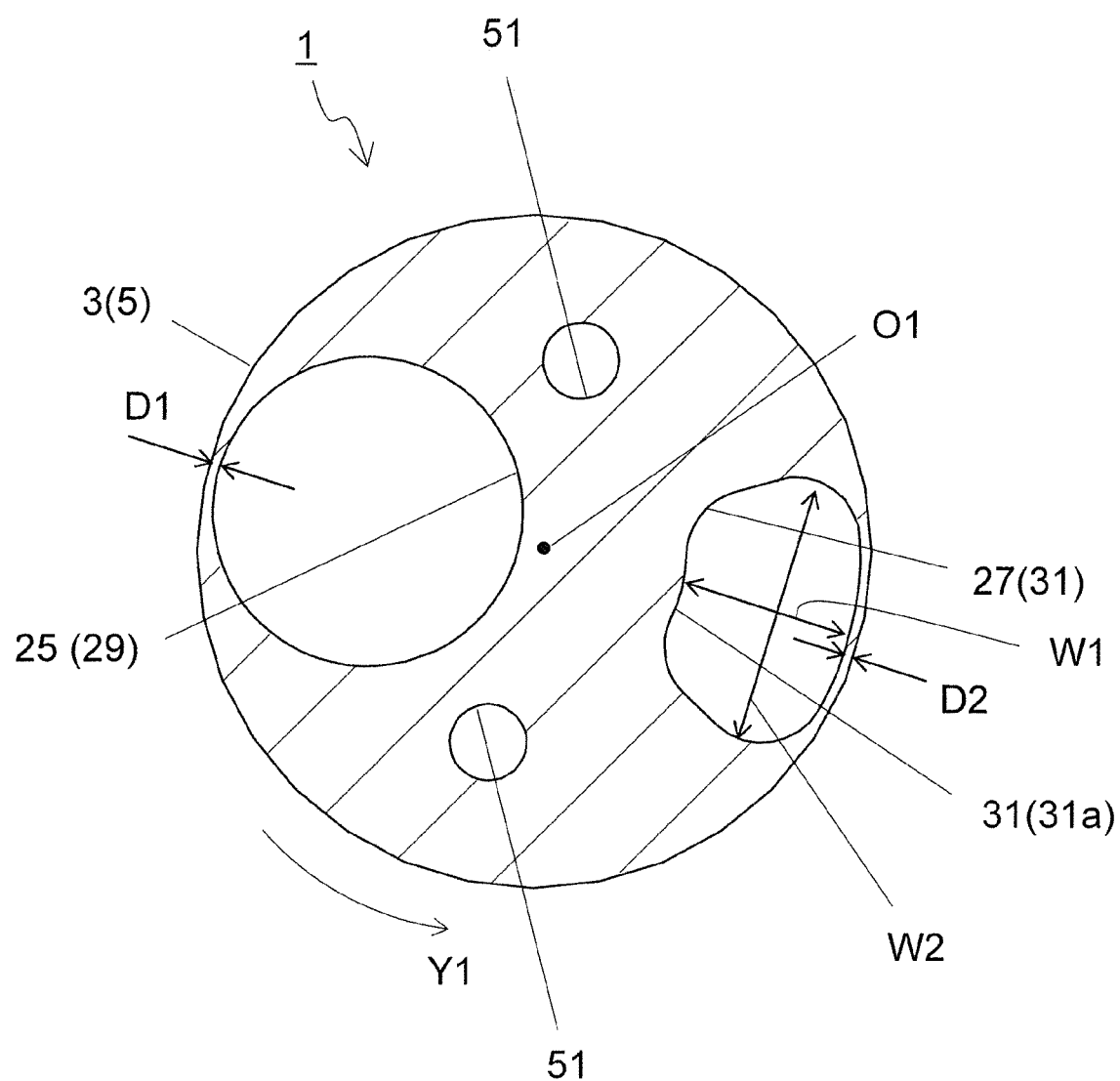
FIG. 9 is a sectional view taken along line IX-IX in the cutting tool illustrated in FIG. 6.
Figure 10:
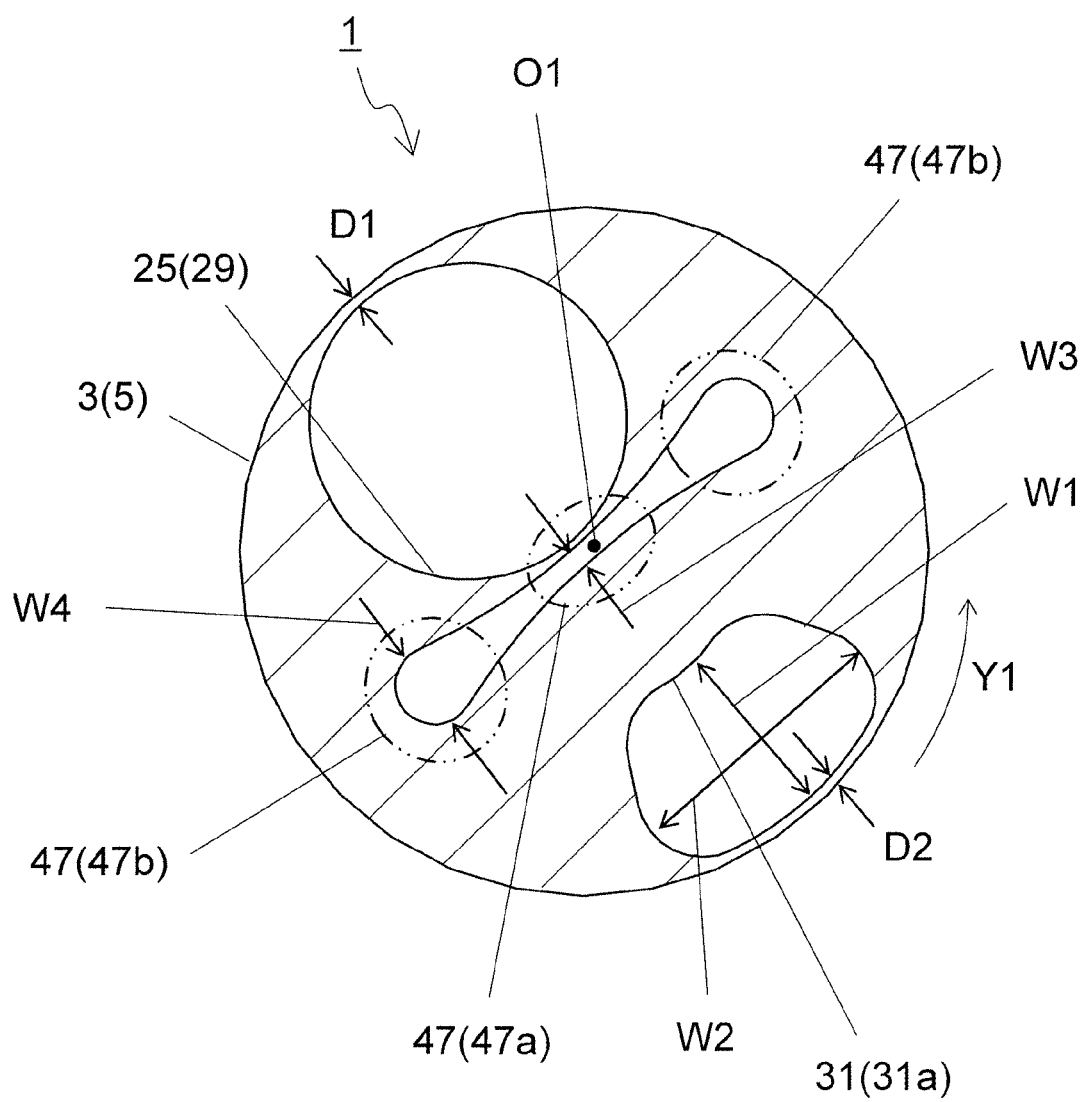
FIG. 10 is a sectional view taken along line X-X in the cutting tool illustrated in FIG. 6.

In one embodiment illustrated in FIGS. 9 and 10, the first hole 29 may have a circular shape and the second hole 31 may have a long narrow shape in a circumferential direction of the rotation axis O1 in a cross section orthogonal to the rotation axis O1. Specifically, the second hole 31 may have such a shape that a width W2 in the circumferential direction of the rotation axis O1 is larger than a width W1 in a radial direction of the rotation axis O1 in the cross section orthogonal to the rotation axis O1 as illustrated in FIGS. 9 and 10.

Because the second cutting edge 19 is located closer to the outer periphery of the main body 3 than the first cutting edge 17, chips generated by the second cutting edge 19 may be more likely to be divided shorter than chips generated by the first cutting edge 17. The chips generated by the first cutting edge 17 may tend to spirally extend long. However, the first flute 25 extended from the first cutting edge 17 may have the circular shape in the cross section orthogonal to the rotation axis O1 in a non-limiting embodiment illustrated in FIGS. 9 and 10, thus making it possible to stably flow the chips through the first hole 29.

The chips generated by the second cutting edge 19 may tend to be divided relatively shortly. It is however possible to stably flow the chips even if the second flute 27 extended from the second cutting edge 19 has the long narrow shape in the cross section orthogonal to the rotation axis O1.

Because the second hole 31 has the long narrow shape in the circumferential direction of the rotation axis O1 in the cross section orthogonal to the rotation axis O1, the holder 5 may have a large thickness in a radial direction thereof. Specifically, at least one of a web thickness of the holder 5 and a thickness between the second hole 31 and the outer peripheral surface in the holder 5 may be large. The holder 5 may have therefore high durability. Accordingly, the cutting tool 1 in a non-limiting embodiment illustrated in FIGS. 9 and 10 may have enhanced durability and chip discharge performance.

As used herein, "web thickness" may correspond to a diameter of one of imaginary circles being in contact with both the first hole 29 and the second hole 31 which has a maximum diameter in the cross section orthogonal to the rotation axis O1. The durability of the holder 5 may become higher with increasing the web thickness.

Although the web thickness of the holder 5 may be larger than the thickness between the second hole 31 and the outer peripheral surface in the holder 5, the holder 5 may have higher durability if the thickness between the second hole 31 and the outer peripheral surface in the holder 5 is larger than the web thickness of the holder 5.

A ratio of the width W2 to the width W1 (=W2/W1) may be settable to, for example, approximately 1.1 or more but 2.4 or less. The shape of the first hole 29 in the cross section orthogonal to the rotation axis O1 need not be strictly the circular shape, and the shape of the first hole 29 may be a shape closer to a circular shape than the second hole 31 having the long narrow shape. Specifically, the ratio W2/W1 in the first hole 29 may have a value closer to 1 than the ratio W2/W1 in the second hole 31.

The thickness of the holder 5 between the first hole 29 and the outer peripheral surface may be indicated by D1, and the thickness of the holder 5 in between the second hole 31 and the outer peripheral surface may be indicated by D2.

The holder 5 may include a part thereof whose D1 increases as going toward the second end 3b. In this case, a part of the holder 5 which is located relatively near the second end 3b may have high rigidity. The holder 5 may be therefore less likely to bend, and the holder 5 may be less prone to vibration during the cutting process.

The holder 5 may include a part thereof whose D2 increases as going toward the second end 3b. Also in this case, a part of the holder 5 which is located relatively near the second end 3b may have high rigidity. The holder 5 may be therefore less likely to bend, and the holder 5 may be less prone to vibration during the cutting process.

For the above reasons, the holder 5 may include the part thereof whose D1 and D2 increase as going toward the second end 3b. In this case, the holder 5 may be much less likely to bend, and the holder 5 may be much less prone to vibration during the cutting process.

Figure 8:
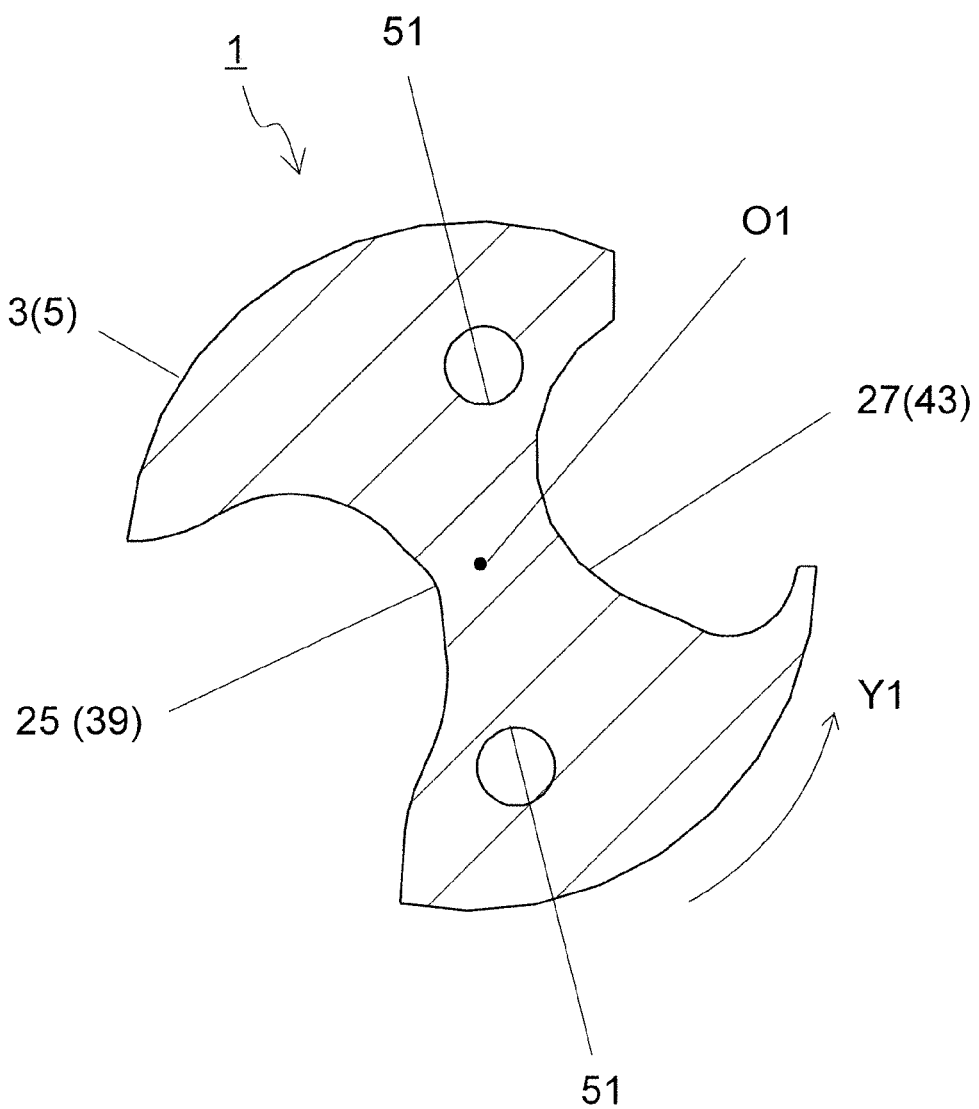
FIG. 8 is a sectional view taken along line VIII-VIII in the cutting tool illustrated in FIG. 6.

The holder 5 is not limited to ones which have a specific size. An outer diameter in a cross section illustrated in FIGS. 8 to 10 may be set to, for example, 6 mm or more but 75 mm or less. If the outer diameter is indicated by D and a length of the holder 5 in a direction along the rotation axis O1 is indicated by L, the length L may be set to, for example, 2D or more but 12D or less.

For example, metals, such as steel, cast iron and aluminum alloy, and resin materials, such as FRP, may be usable as a material of the holder 5. Of these materials, steel may contribute to enhancing toughness of the holder 5.

The first insert 7 and the second insert 9 are not limited to specific dimensions. A maximum width thereof in a front view of the upper surface 21 may be set to, for example, 3 mm or more but 25 mm or less. A height from the lower surface to the upper surface 21 may be set to, for example, 1 mm or more but 10 mm or less. As used herein, "the height from the lower surface to the upper surface 21" may denote a length in a direction parallel to a central axis passing through a center of the upper surface 21 and a center of the lower surface, in between an upper end of the upper surface 21 and a lower end of the lower surface.

For example, cemented carbide and cermet may be usable as a material of the first insert 7 and the second insert 9.

Examples of composition of the cemented carbide may include WC—Co, WC—TiC—Co and WC—TiC—TaC—Co. As used herein, WC, TiC and TaC may be hard particles and Co may be a binding phase.

The cermet may be a sintered composite material obtainable by compositing metal into a ceramic component. Examples of the cermet may include titanium compounds composed mainly of titanium carbide (TiC) or titanium nitride (TiN).

Surfaces of the first insert 7 and the second insert 9 may be coated with a coating film by using chemical vapor deposition (CVD) method or physical vapor deposition (PVD) method. Examples of a composition of the coating film may include titanium carbide (TiC), titanium nitride (TiN), titanium carbonitride (TiCN) and alumina ($Al_2O_3$).

Figure 4:
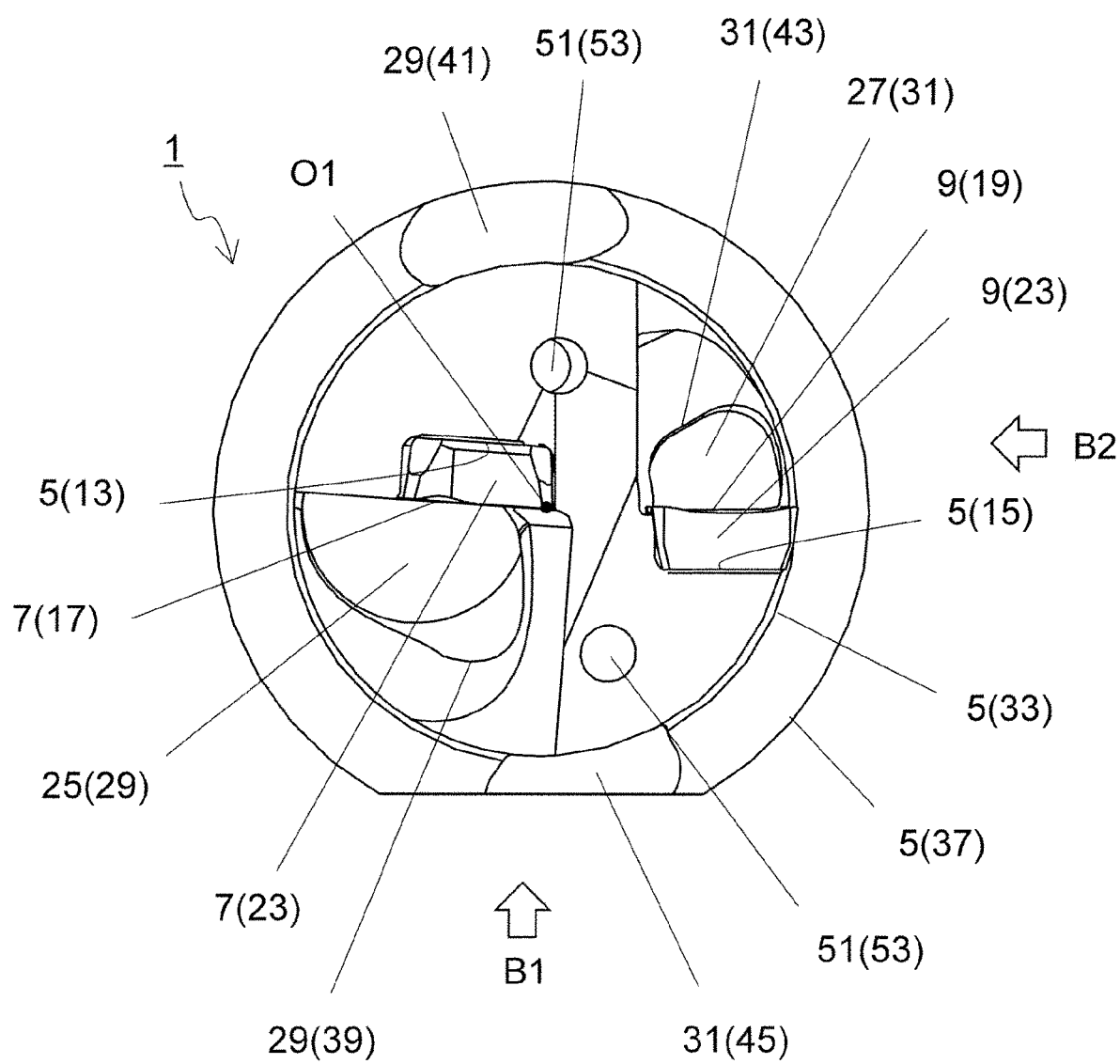
FIG. 4 is a front view of the cutting tool illustrated in FIG. 1 as viewed toward a first end.
Figure 5:
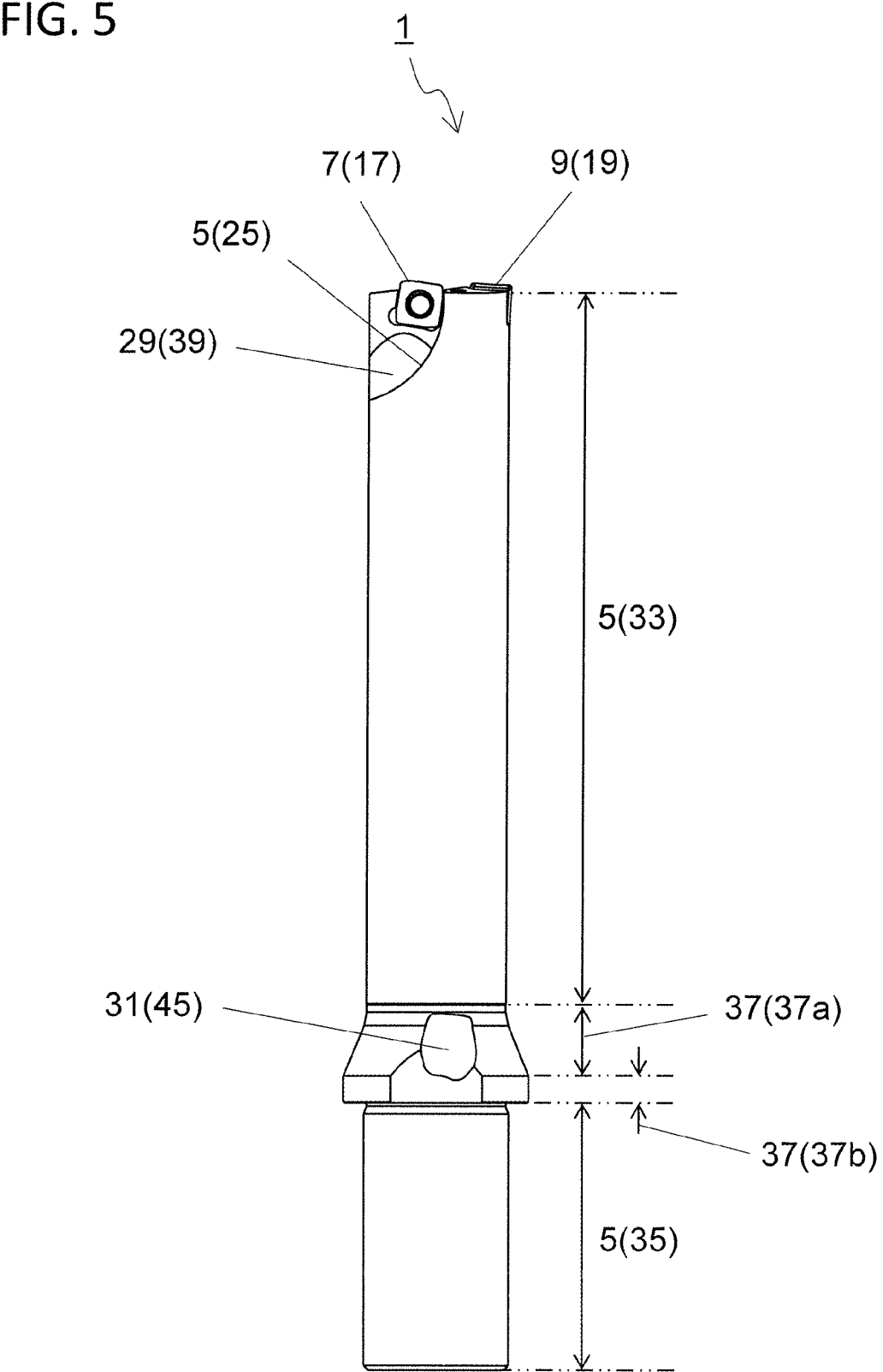
FIG. 5 is a side view of the cutting tool illustrated in FIG. 4 as viewed from a B1 direction.
Figure 6:
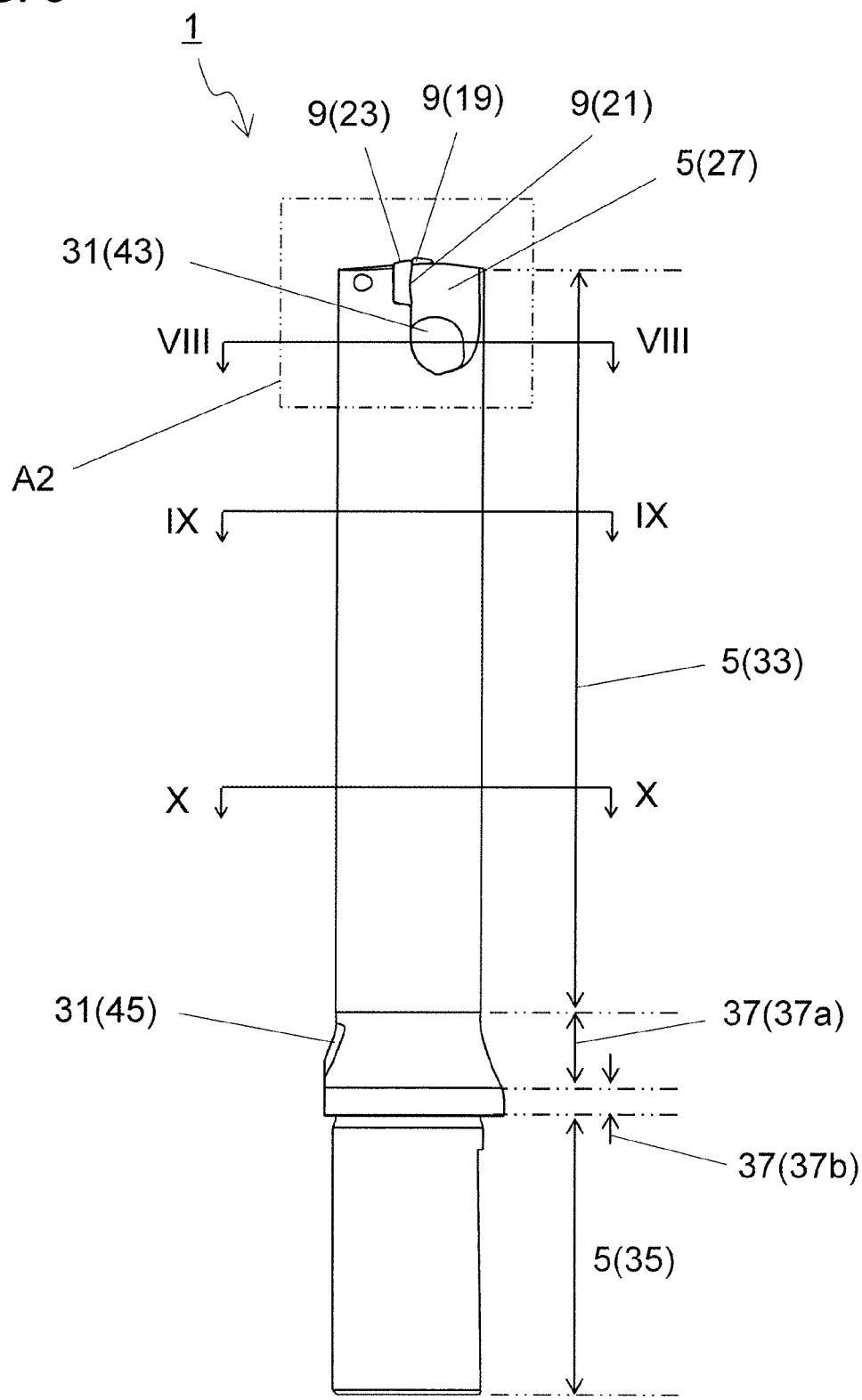
FIG. 6 is a side view of the cutting tool illustrated in FIG. 4 as viewed from a B2 direction.
Figure 7:
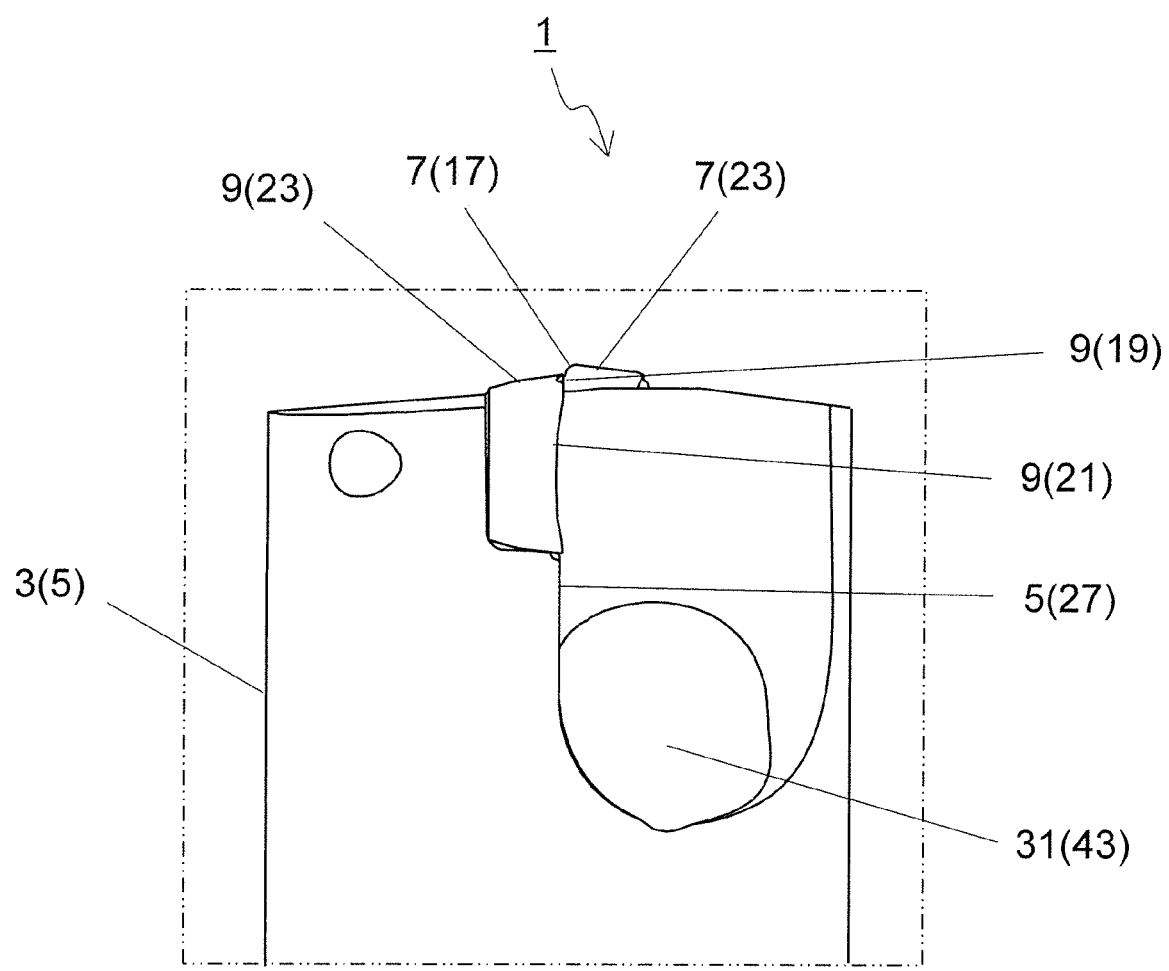
FIG. 7 is an enlarged view of a region A2 illustrated in FIG. 6.

As in a non-limiting embodiment illustrated in FIG. 4, the first cutting edge 17 may include the rotation axis O1 and the second cutting edge 19 may be located away from the rotation axis O1. A stable drilling process can be carried out if the first cutting edge 17 includes the rotation axis O1 as viewed toward the first end 3a of the main body 3.

If the first cutting edge 17 includes the rotation axis O1, chips generated by the first cutting edge 17 may tend to spirally extend long in a short pitch. However, with the cutting tool 1 in a non-limiting embodiment illustrated in FIGS. 9 and 10, spiral shaped chips can be stably passed through the first hole 29 because the first hole 29 has the circular shape in the cross section orthogonal to the rotation axis O1.

In cases where the first cutting edge 17 includes the rotation axis O1 and the second cutting edge 19 is located away from the rotation axis O1 as viewed toward the first end 3a of the main body 3, the chips generated by the second cutting edge 19 may be less likely to interfere with the chips generated by the first cutting edge 17. Consequently, chip clogging may be less likely to occur.

The second hole 31 may have the long narrow shape in the circumferential direction of the rotation axis O1 in the cross section orthogonal to the rotation axis O1 in a non-limiting embodiment illustrated in FIGS. 9 and 10. The main body 3 may include a part thereof whose thickness is kept constant from the outer peripheral surface to the second hole 31. If the second hole 31 is located as described above, a part of the main body 3 which is interposed between the outer peripheral surface and the second hole 31 in the main body 3 may be less subjected to variations in thickness. The main body 3 may therefore have high durability.

Figure 11:
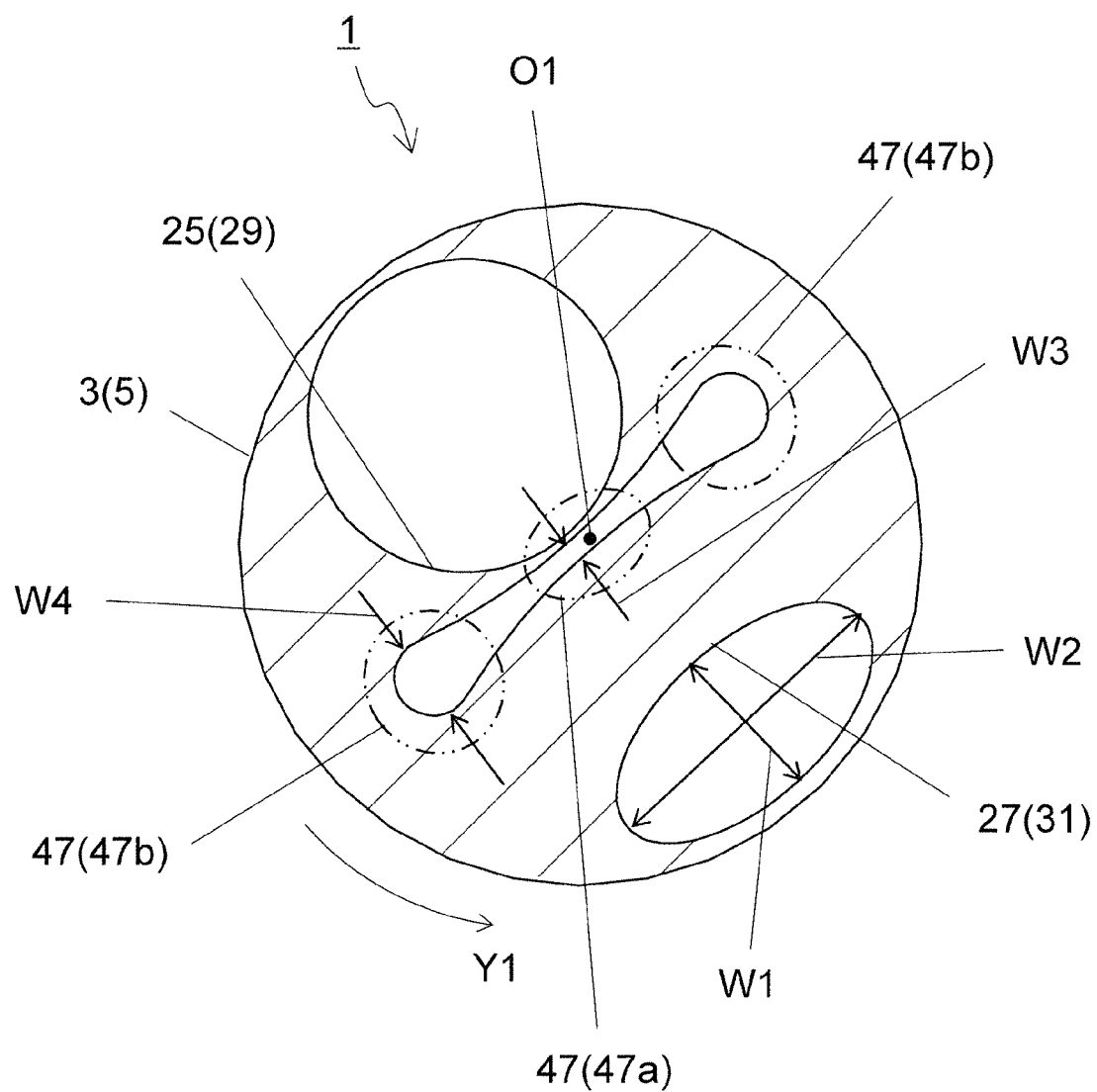
FIG. 11 is a sectional view illustrating a cutting tool in a non-limiting embodiment.

The shape of the second hole 31 in the cross section orthogonal to the rotation axis O1 is not limited to a specific shape as long as it may have a long narrow shape in the circumferential direction of the rotation axis O1. For example, the second hole 31 in the above cross section may have an elliptical shape as illustrated in FIG. 11. The second hole 31 may have a shape curved along the circumferential direction of the rotation axis O1 in a non-limiting embodiment illustrated in FIGS. 9 and 10.

The second hole 31 in a non-limiting embodiment illustrated in FIGS. 9 and 10 may include a portion 31a having a convex curved surface shape located on a side of the rotation axis O1 in the cross section orthogonal to the rotation axis O1. If the second hole 31 includes the portion 31a, the web thickness of the holder 5 may tend to become larger, thus leading to higher durability of the holder 5.

Positions of the first hole 29 and the second hole 31 in the cross section orthogonal to the rotation axis O1 are not particularly limited. A thickness of the main body 3 from the rotation axis O1 to the second hole 31 may be larger than a thickness of the main body 3 from the rotation axis O1 to the first hole 29 in a non-limiting embodiment illustrated in FIGS. 9 and 10. In other words, the second hole 31 may be located more away from the rotation axis O1 than the first hole 29.

If the first hole 29 and the second hole 31 are located as described above, an inner diameter of the first hole 29 may tend to become large, and the web thickness of the holder 5 may tend to become large. These may lead to high chip discharge performance in the first hole 29 and high durability of the holder 5.

The main body 3 may have the bar shape extended along the rotation axis O1 from the first end 3a to the second end 3b. An outer diameter of the main body 3 may be kept constant from a side of the first end 3a to a side of the second end 3b. Alternatively, the main body 3 may include a portion thereof whose outer diameter is relatively large as illustrated in FIG. 1 or the like.

The main body 3 in a non-limiting embodiment illustrated in FIG. 1 or the like may be formed by a cutting part 33 located on a side of the first end 3a, a holding part 35 located on a side of the second end 3b, and a flange part 37 located between the cutting part 33 and the holding part 35. The flange part 37 may have a larger outer diameter than the cutting part 33 and the holding part 35.

The cutting part 33 may be a part of the main body 3 which is located on the side of the first end 3a, and may include the first cutting edge 17 and the second cutting edge 19. The cutting part 33 may be the part that plays a main role in a drilling process of a workpiece. At least a part of the cutting part 33 may be inserted into a machined hole during the drilling process.

The holding part 35 may be a part of the main body 3 which is located on the side of the first end 3b, and the holding part 35 may be generally called a shank. The holding part 35 may be the part held by, for example, a rotatable spindle in a machine tool during a cutting process.

The flange part 37 may be the part located between the cutting part 33 and the holding part, and may have the larger outer diameter than the cutting part 33 and the holding part 35. The flange part 37 may be usable for positioning the shank relative to the machine tool, and may also be usable for reducing liability that chips flowing through the first flute 25 and the second flute 27 come into contact with the machine tool.

The first flute 25 in a non-limiting embodiment illustrated in FIG. 3 may include a first opening 39 located closer to the first end 3a than the first hole 29, and a first discharge port 41 located closer to the second end 3b than the first hole 29. Chips generated by the first cutting edge 17 may flow in the first flute 25 and may pass through the first opening 39 into the first hole 29. The chips flowing through the first hole 29 may be discharged outside through the first discharge port 41.

The second flute 27 in a non-limiting embodiment illustrated in FIG. 3 may include a second opening 43 located closer to the first end 3a than the second hole 31, and a second discharge port 45 located closer to the second end 3b than the second hole 31. Chips generated by the second cutting edge 19 may flow in the second flute 27 and may pass through the second opening 43 into the second hole 31. The chips flowing through the second hole 31 may be discharged outside through the second discharge port 45.

Positions of the first discharge port 41 and the second discharge port 45 are not particularly limited, and may be located on, for example, the cutting part 33. As in a non-limiting embodiment illustrated in FIG. 3, at least a part of the first discharge port 41 and the second discharge port 45 may be located on the flange part 37. Because the flange part 37 has a larger outer diameter than the cutting part 33, a web thickness of the flange part 37 may tend to become larger than the cutting part 33.

A relatively large load may be applied to a part of the holder 5 at which the first discharge port 41 and the second discharge port 45 are located. However, if at least the part of the first discharge port 41 and the second discharge port 45 is located on the flange part 37 having a large web thickness, the holder 5 may have high durability. In particular, the holder 5 may have higher durability if the entirety of the first discharge port 41 and the second discharge port 45 is located on the flange part 37 having the large web thickness.

The position of the first discharge port 41 may be identical to the position of the second discharge port 45 in a direction along the rotation axis O1. Alternatively, the first discharge port 41 may be located closer to the second end 3b than the second discharge port 45.

Chips generated by the first cutting edge 17 may tend to spirally extend relatively long. Therefore, the chips generated by the first cutting edge 17 may be rotated around the rotation axis O1 in a state in which a part of the chips located in the first hole 29 and a part of the chips is jumped out from the first discharge port 41 during the cutting process.

If the first discharge port 41 is located closer to the second end 3b than the second discharge port 45, the chips generated by the first cutting edge 17 may be less likely to come into contact with the chips generated by the second cutting edge 19. This may make it easier to avoid deterioration of chip discharge performance.

The flange part 37 may include a small diameter part 37a located on a side of the first end 3a, and a large diameter part 37b located closer to the second end 3b than the small diameter part 37a. The small diameter part 37a may have a smaller diameter as going toward the first end 3a as in a non-limiting embodiment illustrated in FIG. 5. The large diameter part 37b may have a constant diameter as in a non-limiting embodiment illustrated in FIG. 5. At least a part of the first discharge port 41 and the second discharge port 45 may be located on the small diameter part 37a.

If the first discharge port 41 and the second discharge port 45 are located as described above, the large diameter part 37a may serve as a wall. Chips discharged from the first discharge port 41 and the second discharge port 45 may therefore be less likely to come into contact with the tool machine, thus leading to a stable cutting process.

The main body 3 in a non-limiting embodiment illustrated in FIG. 1 or the like may further include a flow path located therein. Specifically, the holder 5 may further include a flow path located therein in one embodiment illustrated in FIG. 12. The flow paths may be capable of serving as a portion that permits passage of coolant for cooling the first cutting edge 17 and the second cutting edge 19 during the cutting process.

The coolant may be composed of, for example, water-insoluble cutting fluid or water-soluble cutting fluid, and may be usable by being suitably selected according to a material of a workpiece. Examples of the water-insoluble cutting fluid may include oil-based cutting fluids, inert extreme pressure-based cutting fluids and active extreme pressure-based cutting fluids. Examples of the water-soluble cutting fluid may include emulsion-type, soluble-type and solution-type cutting fluids. Alternatively, the coolant may be gases, such as inert gas, instead of fluid ones.

A configuration of the flow path is not particularly limited as far as being capable of permitting passage of the coolant. The flow path in a non-limiting embodiment illustrated in FIG. 12 may include a first flow path 47, an inflow port 49, a plurality of second flow paths 51 and a plurality of outflow ports 53. The first flow path 47 may be located on a side of the second end 3b. The inflow port 49 may connect to the first flow path 47. The plurality of second flow paths 51 may be extended from the first flow path 47 toward the first end 3a. The plurality of outflow ports 53 may individually connect to end portions on a side of the first end 3a in the plurality of second flow paths 51.

Figure 12:
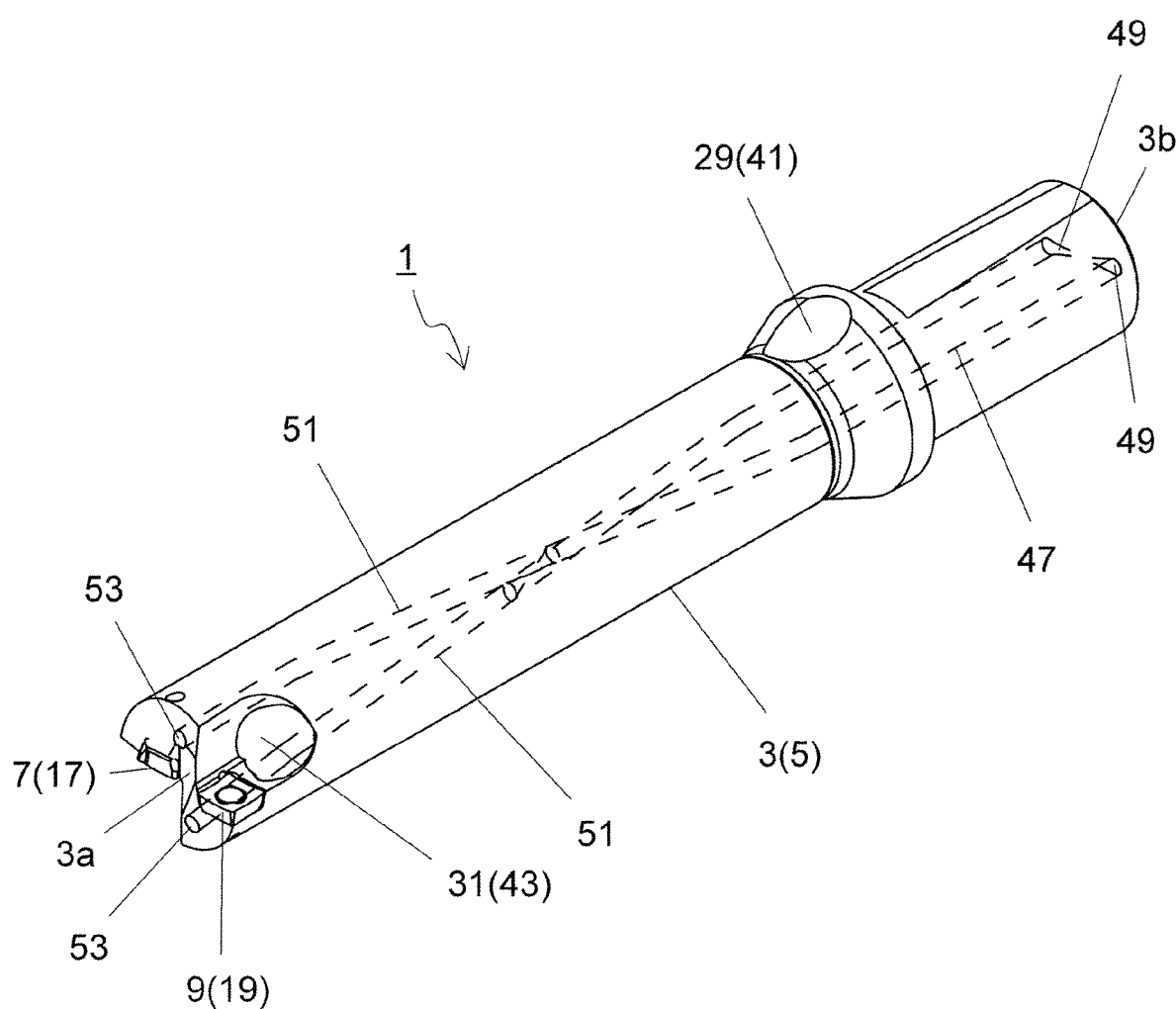
FIG. 12 is a perspective view of a flow path in the cutting tool illustrated in FIG. 1.

The flow path may include two second flow paths 51 and two outflow ports 53 in a non-limiting embodiment illustrated in FIG. 12. This may make it possible to efficiently cool each of the first cutting edge 17 and the second cutting edge 19.

The first flow path 47 in a non-limiting embodiment illustrated in FIG. 10 may have a long narrow shape extended in an inclined direction relative to an imaginary straight line L1 connecting a center of the first hole 29 and a center of the second hole 31 in the cross section orthogonal to the rotation axis O1. If the first flow path 47 has the above shape, the first flow path 47 may have a large space, and the holder 5 between the first flow path 47 and both the first hole 29 and the second hole 31 may have a large thickness. The holder 5 may therefore have higher durability.

In particular, if the first flow path 47 has the long narrow shape extended in the direction orthogonal to the imaginary straight line L1 in the cross section orthogonal to the rotation axis O1, the holder 5 between the first flow path 47 and both the first hole 29 and the second hole 31 may have a large thickness, and the first flow path 47 may have a larger space.

The first flow path 47 in a non-limiting embodiment illustrated in FIG. 10 may include a first portion 47a located on the imaginary straight line L1 and a second portion 47b located away from the first portion 47a in the cross section orthogonal to the rotation axis O1. A width W4 in a direction along the imaginary straight line L1 in the second portion 47b may be larger than a width W3 in a direction along the imaginary straight line L1 in the second portion 47b.

If the first flow path 47 has the above shape, the holder 5 between the first flow path 47 and both the first hole 29 and the second hole 31 may have a large thickness, and the first flow path 47 may have a larger space. The holder 5 may therefore have higher durability and permits passage of a larger amount of coolant.

In particular, if an end portion on a side of an outer periphery in the second portion 47b is more away from the rotation axis O1 than the first hole 29 and the second hole 31 in the cross section orthogonal to the rotation axis O1 as in a non-limiting embodiment illustrated in FIGS. 9 and 10, a part of the holder 5 which is located closer to the rotation axis O1 may have a large thickness. The holder 5 may therefore have still higher durability.

While the cutting tools 1 in non-limiting embodiments of the present disclosure have been illustrated and described, the present invention is not limited thereto, and it is, of course, possible to make any arbitrary ones in so far as they do not depart from the gist of the present invention. For example, the present disclosure may of course be ones which are obtained by variously combining the configurations of the above embodiments.

<Method for Manufacturing Machined Product>

Methods for manufacturing a machined product in embodiments may be described in detail below by exemplifying the case of using the cutting tool 1 in the above embodiment. The machined product may be manufacturable by carrying out a cutting process of a workpiece 101. The description may be made with reference to FIGS. 13 to 15.

The method for manufacturing the machined product in a non-limiting embodiment may include the following steps (1) to (4).

Figure 13:
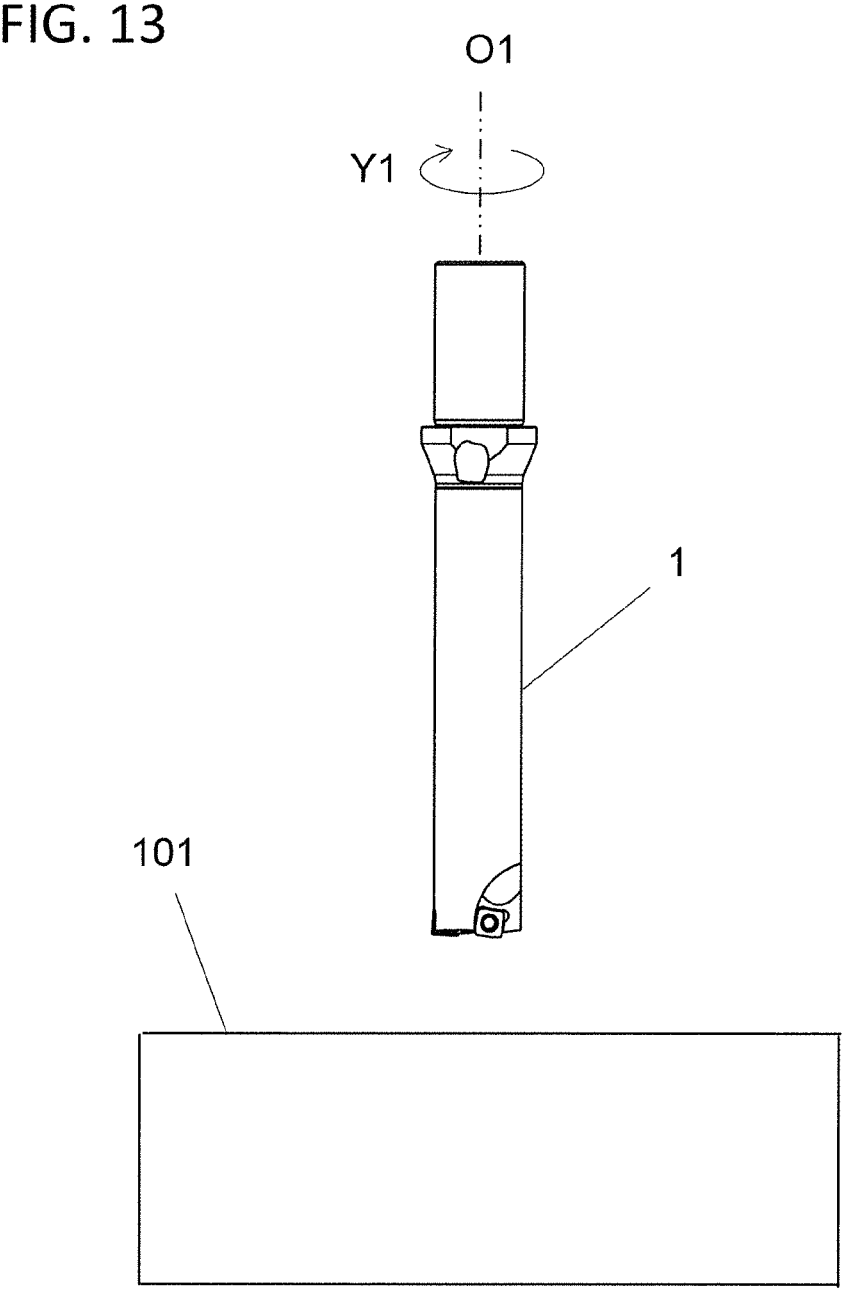
FIG. 13 is a schematic diagram illustrating one of the steps in a method for manufacturing a machined product in a non-limiting embodiment.
Figure 14:
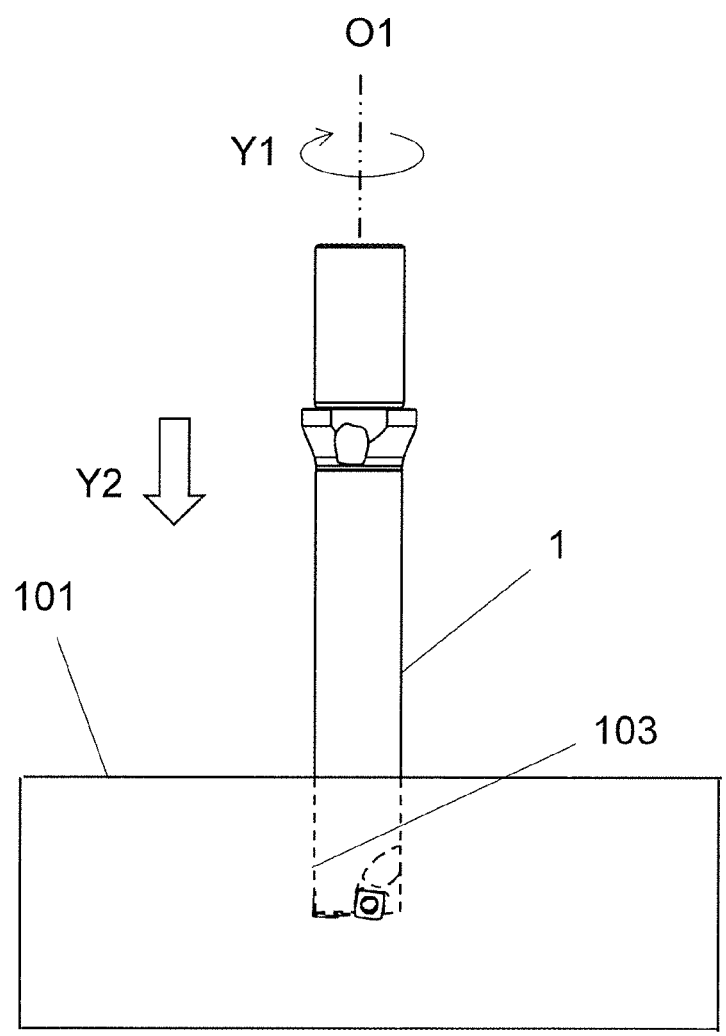
FIG. 14 is a schematic diagram illustrating one of the steps in the method for manufacturing a machined product in a non-limiting embodiment.
Figure 15:
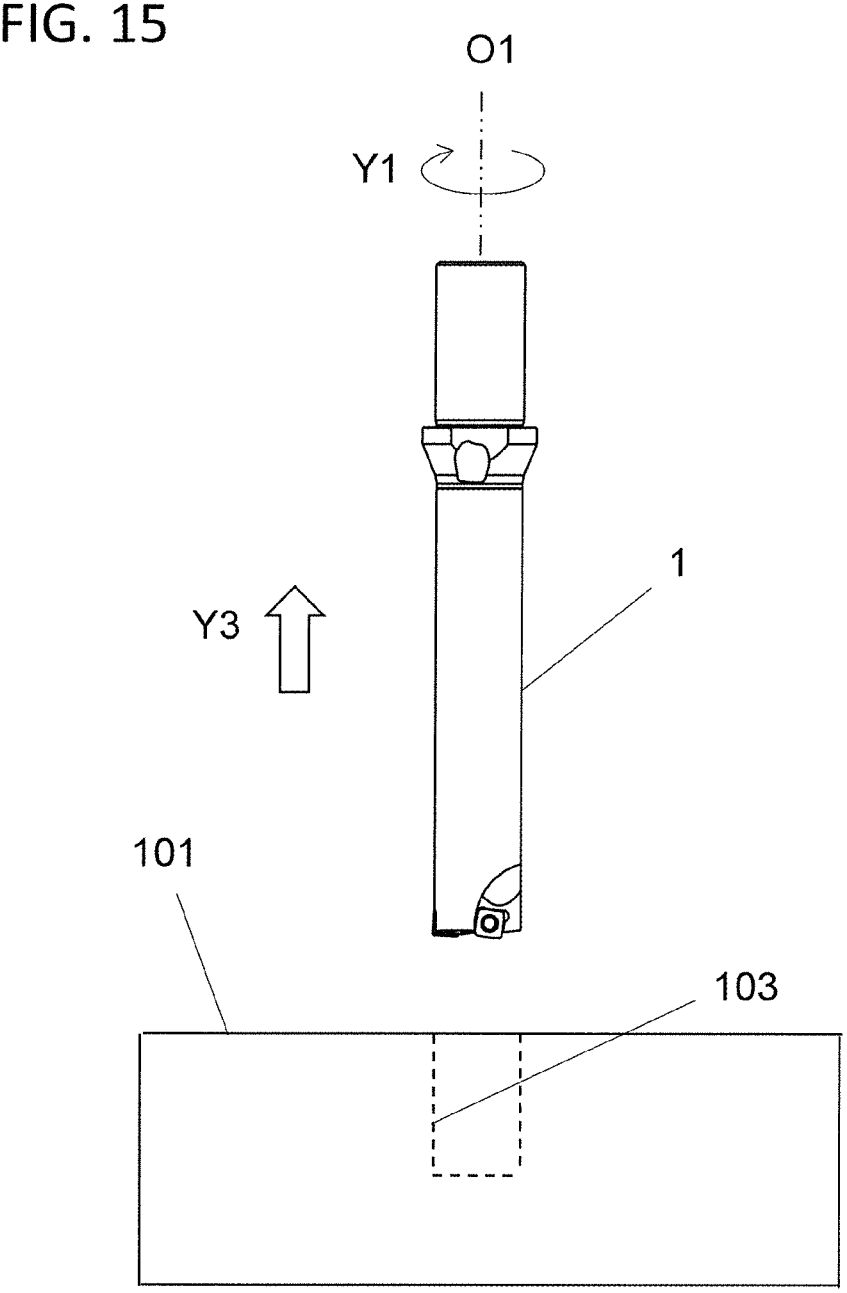
FIG. 15 is a schematic diagram illustrating one of the steps in the method for manufacturing a machined product in a non-limiting embodiment.

(1) putting the cutting tool 1 above the prepared workpiece 101 as illustrated in FIG. 13;

(2) rotating the cutting tool 1 in an arrow Y1 direction around the rotation axis O1 as illustrated in FIG. 13;

(3) bringing the cutting tool 1 near the workpiece 101 in Y2 direction as illustrated in FIGS. 13 and 14;

(4) forming a machined hole (through hole) 103 in the workpiece 101 as illustrated in FIG. 14; and (5) moving the cutting tool 1 away from the workpiece 101 in Y3 direction as illustrated in FIG. 15.

Excellent machinability may be attainable through the above steps.

The step (3) may be carried out by, for example, fixing the workpiece 101 onto a table for a machine tool with the cutting tool 1 attached thereto, and by bringing the cutting tool 1 being rotated near the workpiece 101. In this step, the workpiece 101 and the cutting tool 1 may be brought near each other. For example, the workpiece 101 may be brought near the cutting tool 1.

In the step (4), the first cutting edge and the second cutting edge of the cutting tool 1 being rotated may be brought into contact with a desired position on a surface of the workpiece 101 by bringing the cutting tool 1 nearer the workpiece 101.

Similarly to the step (2), the workpiece 101 and the cutting tool 1 may be separated from each other in the step (5). For example, the workpiece 101 may be moved away from the cutting tool 1.

In cases where the cutting process of the workpiece 101 as described above is carried out a plurality of times, specifically, a plurality of machined holes 103 may be formed in the single workpiece 101, the step of bringing the first cutting edge and the second cutting edge of the cutting tool 1 into contact with different portions of the workpiece 101 may be repeated while the cutting tool 1 is kept rotating.

DESCRIPTION OF THE REFERENCE NUMERAL 1 cutting tool
3 main body
3a first end 3b second end
5 holder
7 first insert
9 second insert
11 fixing member
13 first pocket
15 second pocket
17 first cutting edge
19 second cutting edge
21 upper surface
23 side surface
25 first flute
27 second flute
29 first hole
31 second hold
31a portion
33 cutting part
35 holding part
37 flange part
37a small diameter part
37b large diameter part
39 first opening
41 first discharge port
43 second opening
45 second discharge port
47 first flow path
47a first portion
47b second portion
49 inflow port
51 second flow path
53 outflow port
101 workpiece
103 machined hole

The invention claimed is:

1. A cutting tool, comprising:
a main body having a bar shape extended from a first end to a second end, the main body being rotatable around a rotation axis, wherein
the main body comprises
a first cutting edge located on a side of the first end,
a second cutting edge located on a side of the first end and located closer to an outer periphery of the main body than the first cutting edge,
a first flute extended from the first cutting edge toward the second end, and
a second flute extended from the second cutting edge toward the second end,
the first flute comprises a first hole located in the main body,
the second flute comprises a second hole located in the main body, and
the first hole has a circular shape and the second hole has a long narrow shape in a circumferential direction of the rotation axis in a cross section orthogonal to the rotation axis.

2. The cutting tool according to claim 1, wherein the first cutting edge crosses the rotation axis and the second cutting edge is located away from the rotation axis.

3. The cutting tool according to claim 1, wherein the main body comprises a part whose thickness from an outer peripheral surface to the second hole is kept constant in the cross section orthogonal to the rotation axis.

4. The cutting tool according to claim 1, wherein the second hole comprises a portion having a convex curved surface shape located on a side of the rotation axis in the cross section orthogonal to the rotation axis.

5. The cutting tool according to claim 1, wherein a thickness of the main body from the rotation axis to the second hole is larger than a thickness of the main body from the central axis to the first hole in the cross section orthogonal to the rotation axis.

6. The cutting tool according to claim 1, wherein the main body is formed by
a cutting part located on a side of the first end,
a holding part located on a side of the second end, and
a flange part located between the cutting part and the holding part and having a larger outer diameter than the cutting part and the holding part,
the first flute further comprises a first discharge port located closer to the second end than the first hole,
the second flute further comprises a second discharge port located closer to the second end than the second hole, and
at least a part of the first discharge port and the second discharge port is located on the flange part.

7. The cutting tool according to claim 6, wherein the flange part comprises:
a small diameter part located on a side of the first end and having a smaller diameter as going toward the first end, and
a large diameter part located closer to the second end than the small diameter part and having a constant diameter, and
at least a part of the first discharge port and the second discharge port is located on the small diameter part.

8. The cutting tool according claim 6, wherein the first discharge port is located closer to the second end than the second discharge port.

9. The cutting tool according to claim 1, wherein
the main body further comprises a flow path located therein,
the flow path comprises
a first flow path located on a side of the second end,
an inflow port connecting to the first flow path,
a plurality of second flow paths extended from the first flow path toward the first end, and
a plurality of outflow ports individually connecting to end portions on a side of the first end in the plurality of second flow paths, and
the first flow path has a long narrow shape extended in an inclined direction relative to an imaginary straight line connecting to a center of the first hole and a center of the second hole in the cross section orthogonal to the rotation axis.

10. The cutting tool according to claim 9, wherein the first flow path has a long narrow shape extended in a direction orthogonal to the imaginary straight line in the cross section orthogonal to the rotation axis.

11. The cutting tool according to claim 9, wherein
the first flow path comprises, in the cross section orthogonal to the rotation axis,
a first portion located on the imaginary straight line,
a second portion located away from the first portion, and
a width in a direction along the imaginary straight line in the second portion is larger than a width in a direction along the imaginary straight line in the first portion.

12. The cutting tool according to claim 9, wherein an end portion on a side of the outer periphery in the second portion is located more away from the rotation axis than the first hole and the second hole in the cross section orthogonal to the rotation axis.

13. A method for manufacturing a machined product, comprising:
   rotating the cutting tool according to claim 1;
   bringing the cutting tool being rotated into contact with a workpiece; and
   moving the cutting tool away from the workpiece.

* * * * *